United States Patent
Chaudhary et al.

(10) Patent No.: US 8,958,701 B2
(45) Date of Patent: Feb. 17, 2015

(54) METHODS AND SYSTEMS OF PRESERVING CLIENT OVERHEAD BYTES IN OPTICAL TRANSPORT NETWORK TUNNELING APPLICATIONS

(71) Applicants: Abhishek Chaudhary, Alpharetta, GA (US); Hongxing Meng, Cumming, GA (US); Satish Gopalakrishna, Alpharetta, GA (US)

(72) Inventors: Abhishek Chaudhary, Alpharetta, GA (US); Hongxing Meng, Cumming, GA (US); Satish Gopalakrishna, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 259 days.

(21) Appl. No.: 13/728,011

(22) Filed: Dec. 27, 2012

(65) Prior Publication Data

US 2014/0186019 A1 Jul. 3, 2014

(51) Int. Cl.
| | |
|---|---|
| G02F 1/00 | (2006.01) |
| G02F 2/00 | (2006.01) |
| H01S 3/00 | (2006.01) |
| H04B 10/00 | (2013.01) |
| H04J 14/00 | (2006.01) |
| H04B 10/04 | (2006.01) |
| H04B 10/12 | (2006.01) |
| H04B 10/032 | (2013.01) |

(52) U.S. Cl.
CPC .................................. H04B 10/032 (2013.01)
USPC ............ 398/140; 398/1; 398/2; 398/3; 398/4; 398/5; 398/6; 398/7; 398/8; 398/182; 398/202

(58) Field of Classification Search
CPC .... H04B 10/03; H04B 10/032; H04B 10/035; H04B 10/038; H04B 14/0287; H04B 14/0289; H04B 14/029; H04B 14/0291; H04B 14/0293; H04B 14/0294; H04B 14/0295; H04B 14/0297; H04B 14/0298
See application file for complete search history.

(56) References Cited

U.S. PATENT DOCUMENTS

| | | | |
|---|---|---|---|
| 2005/0141569 A1* | 6/2005 | Meagher et al. | 370/907 |
| 2010/0054731 A1 | 3/2010 | Oltman et al. | |
| 2010/0296809 A1 | 11/2010 | Yan et al. | |
| 2011/0286742 A1 | 11/2011 | Nichols et al. | |
| 2012/0014284 A1 | 1/2012 | Ranganathan et al. | |
| 2012/0224845 A1 | 9/2012 | Swinkels et al. | |

FOREIGN PATENT DOCUMENTS

| | | |
|---|---|---|
| EP | 2093916 B1 | 8/2009 |
| WO | 0197435 A2 | 12/2001 |

* cited by examiner

*Primary Examiner* — Darren E Wolf
(74) *Attorney, Agent, or Firm* — Clements Bernard PLLC; Christopher L. Bernard; Lawrence A. Baratta, Jr.

(57) ABSTRACT

A method, a network, and a node each implement the transmission of Automatic Protection Switching (APS) switching coordination bytes across an OTN network. A working signal and a protection signal are received, one of which is designated as an active signal. The active signal is encapsulated in an Optical channel Data Unit (ODU) signal. APS switching coordination bytes from the working and protection signals are placed in an overhead segment of the ODU signal. The ODU signal is transmitted into and received from an Optical Transport Network (OTN) network. The working and protection signals are recreated based on the active signal encapsulated in the ODU signal and the APS switching coordination bytes in the overhead segment. The recreated working and protection signals are transmitted. In this manner, a single ODU signal may be used to transmit both the working and protection signals.

21 Claims, 8 Drawing Sheets

METHODS AND SYSTEMS OF PRESERVING CLIENT OVERHEAD BYTES IN OPTICAL TRANSPORT NETWORK TUNNELING APPLICATIONS

FIELD OF THE DISCLOSURE

The present disclosure relates generally to transmitting data over an Optical Transport Network (OTN). More particularly, the present disclosure relates to transmitting Automatic Protection Switching (APS) switching-coordination bytes across an OTN network in an overhead segment of an Optical channel Data Unit (ODU) frame in which an active signal is encapsulated.

BACKGROUND OF THE DISCLOSURE

Automatic Protection Switching (APS) refers to automated fault detection and corrective switching in a data communication network. When failure is detected in a particular transmission channel, communication resumes in a standby channel. Failure detection and recovery switching occur automatically, providing high reliability and availability through redundancy and automatic re-routing. APS in various forms has been developing for several decades such as with Synchronous Optical Network (SONET) and Synchronous Digital Hierarchy (SDH). Early variants of APS were applied in microwave systems and in some of the first asynchronous fiber networks. Currently, standardized forms of APS are required by many data communication network clients. Accordingly, network providers and planners are expected to comply with APS protocols and to provide some degree of reverse-compatibility with established APS standards even as network hardware and transmission media evolve.

According to recent APS convention, transmission was considered to occur from a head-end to a tail-end along a line designated as a "work line." A separate "protect line" between the head end and tail end was designated for use if the work line fails. The head-end and tail-end were typically network elements that conventionally conducted bridging and selecting functions, respectively. A line could at one time be considered as a physical transmission route, such as along a particular electrical wire, along an optical fiber, or along a particular physical itinerary of such signal carriers. The work and protect lines in some cases were and are entirely physically redundant, with no significant hardware differences between the two. In many applications, there is no expectation or particular likelihood that the work line is more typically used than the protect line for active signal transmission. Thus, by some current terminology, an "active line" is tentatively designated as the signal carrying line, whether that be the work or the protect line.

In contrast to the technologies for which APS originated, a typical modern optical network element is bidirectional and, accordingly, need not be exclusively designated as a head-end or tail-end node. Modern networks have inherently redundant architectures considered as meshes, rings, or even clouds, in which discrete designations of work and protect lines are arguably obviated. Nonetheless, many network clients requiring APS compliance expect network transparency through two apparent channels, which are nominally termed as work and protect lines, either of which may serve as an active signal-carrying line as the other is held in reserve or utilized for low-priority "preemptible" traffic.

A protection switching request, directing traffic from a work line to a protect line, can be prompted automatically when loss or degradation of a signal is detected, for example at a tail-end. Protection switching requests can also be prompted by network carrier or client-side technicians and engineers. Switching-coordination bytes, APS "K-bytes" in SONET/SDH, for example, are typically placed in the overhead portions of client data-transmission frames to convey protection switching requests and confirmations. Despite whether discrete work and protect lines are only nominal or apparent in an inherently redundant network, many network clients expect APS K-bytes to be transparently conducted. However, corresponding overhead portions of client frames are typically terminated in favor or more native overhead formats as client data enters and transits a carrier network such as an Optical Transport Network (OTN) cloud. The contents of each of OTN references ITU-T G.709 (December 2009) "Interfaces for the Optical Transport Network (OTN)" and G.798 (October 2010) "Characteristics of optical transport network hierarchy equipment functional blocks" are incorporated by reference herein.

In 1+1 APS, a protect line is designated for each work line in one-to-one correspondence. In 1:N APS, multiple N work lines rely on a single shared protect line. While additional data such as low-priority traffic can be sent along a protect line at times when no faults are occurring on a work line, APS standards ultimately require some redundancy and therefore represent, at least to some degree, an inefficient use of network resources when conventionally applied. For example, only half of the actual network capacity for prioritized data is utilized when 1+1 APS protection is conventionally applied.

Conventionally, network deployments are moving toward OTN at the optical layer with SONET/SDH encapsulated therein. For example, a client data frame in SONET/SDH format is received and mapped into an Optical channel Data Unit (ODU) frame on an active APS line, the ODUk/j frame is transported over a carrier OTN network. At the other end of carrier network, the client SONET/SDH traffic is de-mapped from ODUk/j and handed off to client equipment. The handoff can be a bridge when the client protocol is 1+1 APS. In such a case, both work and protect lines of the client side will receive identical SONET/SDH frames because the K-Bytes received from the client via the APS protect line are terminated on the send side of the OTN cloud if the APS work line is selected. That is, if the work line is selected at the input side of the OTN cloud, then the K-bytes received from the client via the work line at the input side are ultimately transmitted toward the client via both the work and protect lines at the output side of the OTN cloud. Specifically, the OTN network includes its own protection schemes such as mesh restoration and the like, and it is not efficient to transmit both the work line and the protect line of the 1+1 APS in the OTN network. In that example, K-bytes received from the client via the protect line at the input side are terminated without reaching the client at the output side. Similarly, if the protect line is selected, then K-bytes received from the client via the protect line at the input side are ultimately transmitted toward the client via both the work and protect lines at the output side, with the work line K-bytes at the input side being terminated. Hence, true bidirectional communication is not provided between the two APS groups on opposite sides of the OTN cloud.

By such exemplary mapping of SONET/SDH over OTN, the K1 and K2 bytes, for example as used in multiplex section protection (MSP), could be incorrectly transported if the client traffic is part of APS or other line protection protocols. This could cause client network elements to unnecessarily raise ambiguous alarms. Even worse, this could limit the support of client APS protocols such that only partial APS unidirectional switching is performed without raising any alarms according to APS, Bidirectional Line-Switched Ring (BLSR) and Transoceanic Line Switched Ring (TLSR) protocols. Because of such restrictions the client side protection cannot be BLSR, APS 1:N, APS 1:N+1, or TLSR, and truly bidirectional switching cannot be achieved. Furthermore, if junk K-bytes or inconsistent K-bytes are received at an input or an output side of an OTN cloud, there is no way of isolating and mitigating fault actions. If the work line is selected, K-bytes at the protect line are lost, and if the protect line is selected, K-bytes at the work line are lost.

Thus, improvements are needed for satisfying client expectations toward established APS protocols as handoffs from the OTN cloud while efficiently exploiting inherently redundant modern networks in the OTN cloud.

BRIEF SUMMARY OF THE DISCLOSURE

In an exemplary embodiment, a method of tunneling in an Optical Transport Network (OTN) includes receiving a working signal and a protection signal, the working signal comprising a working payload and working overhead bytes, the protection signal comprising a protection payload and protection overhead bytes, wherein the working signal or protection signal is designated as the active signal comprising an active payload and active overhead bytes; generating an Optical channel Data Unit (ODU) signal comprising a payload and an overhead segment, the ODU signal payload comprising the active payload, the ODU signal overhead segment comprising portions of the working overhead bytes and the protection overhead bytes; and transmitting the ODU signal into an Optical Transport Network (OTN) network, wherein the ODU signal comprises a single signal transported over the OTN network.

In another exemplary embodiment, a network includes a first node configured to receive a working signal and a protection signal each comprising Automatic Protection Switching (APS) switching-coordination bytes; recognize the working signal or the protection signal as an active signal; encapsulate the active signal in an Optical channel Data Unit (ODU) signal; insert the APS switching coordination bytes from the working signal in an overhead segment of the ODU signal; insert the APS switching coordination bytes from the protection signal in an overhead segment of the ODU signal; and transmit the ODU signal into an Optical Transport Network (OTN) network, and a second node configured to receive the ODU signal from the OTN network; recreate the working signal based on the active signal encapsulated in the ODU signal and the APS switching coordination bytes from the working signal inserted in the ODU signal; recreate the protection signal based on the active signal encapsulated in the ODU signal and the APS switching coordination bytes from the protection signal inserted in the ODU signal; transmit the recreated working signal and the recreated protection signal; wherein the ODU signal includes a single signal transmitted over the OTN network while maintaining both the active signal and the APS switching coordination bytes from the working signal and protection signal therein.

In yet another exemplary embodiment, a node is configured to send or receive an Optical channel Data Unit (ODU) signal to or from an Optical Transport Network (OTN) network, the ODU signal having an overhead segment comprising APS switching coordination bytes from a protection signal and APS switching coordination bytes from a working signal. The ODU signal encapsulates either the working signal or the protection signal based on which one is active.

Furthermore, a method according to at least one embodiment described herein is proposed to address the afore-mentioned problem by preserving protection protocol information, such as APS K-bytes, when mapping the client traffic such as SONET/SDH to frames for OTN transport. The APS K-Bytes from both the APS work and protect line are taken from the Line Module to the Control Module and are put into unused OTN overhead bytes and carried along to the other side of the OTN cloud. Then they are de-mapped and put into appropriate K-Bytes in SONET/SDH overhead bytes for the appropriate APS line. This way, the transparent SONET APS lines on one side of the OTN cloud do see the transparent APS SONET lines on other side of the OTN cloud as the corresponding APS lines. Hence, APS 1+1 Bidirectional switching, and 1:N/1:N+1 switching as well, can be performed.

In at least one embodiment, a method provides truly transparent transportation of client traffic according to, for example, APS protocols. Protection mechanisms, such as APS K-bytes, of client and carrier networks are isolated so that networks are easier to manage and network equipment vendors are likely to attract more customers. APS, Virtual Line Switched Ring (VLSR) and BLSR protection mechanisms with unidirectional/bidirectional switching are made possible since K-Bytes can be exchanged between transparent lines and Constant Bit Rate (CBR) lines using appropriate APS/VLSR/BLSR/TLSR K-Byte protocols and hence, bidirectional switching.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of an optical switch supporting connection monitoring in optical networks utilizing SONET, SDH, OTN, and the like.

DETAILED DESCRIPTION OF THE DISCLOSURE

In various exemplary embodiments, methods and systems of preserving client overhead bytes in OTN tunneling applications are described. The methods and systems enable 1+1 APS/VLSR/BLSR/TLSR handoffs to clients while only requiring a single line in an OTN network. APS switching-coordination bytes from work and protect signals are transmitted across an OTN network in an overhead segment of an Optical channel Data Unit (ODU) frame. Either the work or protect signal is designated as the active signal and is encapsulated by the ODU frame. While other examples and advantages are within the scope of these descriptions, particular embodiments are directed toward work and protect signals compliant with one of SONET/SDH protocols. In an exemplary method, a work signal and a protect signal each including APS K-bytes are received, for example, at or from a node considered as a head end from a network client perspective. The active signal is encapsulated in an ODU frame that is transmitted into an OTN network. APS K-bytes from the work and protect signals are carried across the network in an overhead segment of the ODU frame, such as in an unused, reserved, or the like portion of the overhead segment. The ODU frame is then received from the OTN network and the work and protect signals are recreated. The recreated work signal and recreated protect signal are then transmitted, for example, at or from a node considered as a tail end from a network client perspective. Work and protect signals are thereby effectively carried across an OTN network in apparent APS compliance.

Figure 1:
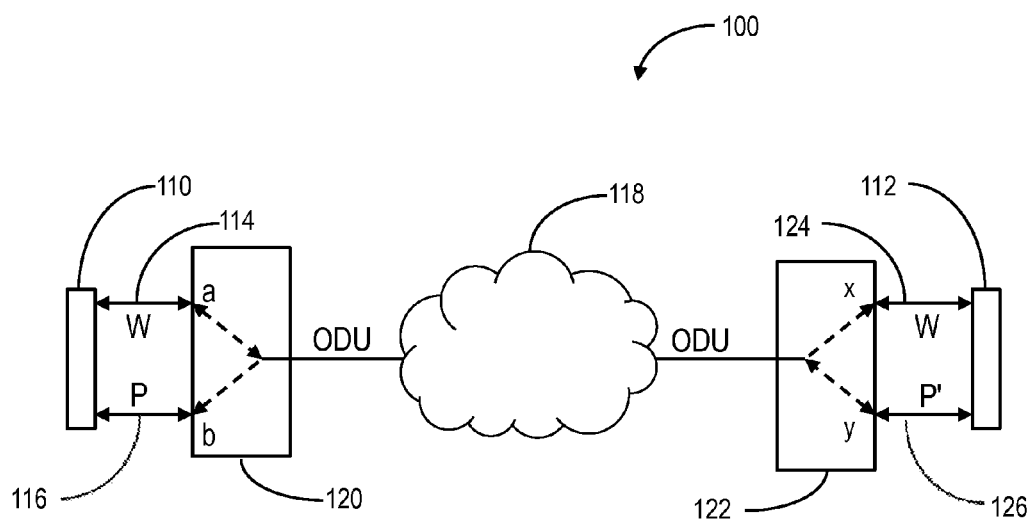
FIG. 1 is a diagram of an embodiment of a network for transmitting switching coordination bytes.

Referring to the system 100 in FIG. 1, a first client network element 110 can be nominally considered as a head end in the example described herein, and the second client network element 112 can be nominally considered as a tail end. The client network elements 110, 112 can include, without limitation, SONET/SDH multiplexers, cross-connects, switches, routers, and the like. Work (W) and protect (P) signals received from work and protect lines 114 and 116 are intended for transmission from the head end 110 to the tail end 112 via a carrier network that includes an OTN network 118. The work and protect signals each include APS K-bytes. The work and protect signals are received by a first carrier network element 120. An ODU frame is transmitted by the first carrier network element 120 into the OTN network 118 and is received at a second carrier network element 122 from the OTN network 118. The carrier network elements 120, 122 are OTN switching nodes and can include, without limitation, optical cross connects, optical switches, OTN multiplexers, wavelength division multiplexing (WDM) terminals, and the like. The recreated work signal (W) and a recreated protect signal (P') are then transmitted from the second carrier network element 122 to the tail end 112 via work and protect lines 124 and 126.

In an exemplary embodiment, the OTN network 118 can include underlying protection in addition to the APS K-byte protection on the work and protect lines 114 and 116. For example, the OTN network 118 can include a mesh interconnection of network elements including the carrier network elements 120, 122. The mesh interconnection can include protection at the OTN layer such as using various mesh restoration schemes as are known in the art. Further, the OTN network 118 can include a control plane such as, without limitation, Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections there between. Importantly, while the client network elements 110, 112 need the K-bytes from both the work and protect lines 114 and 116, it is not efficient to dedicate twice the capacity in the OTN network 118.

Figure 2:
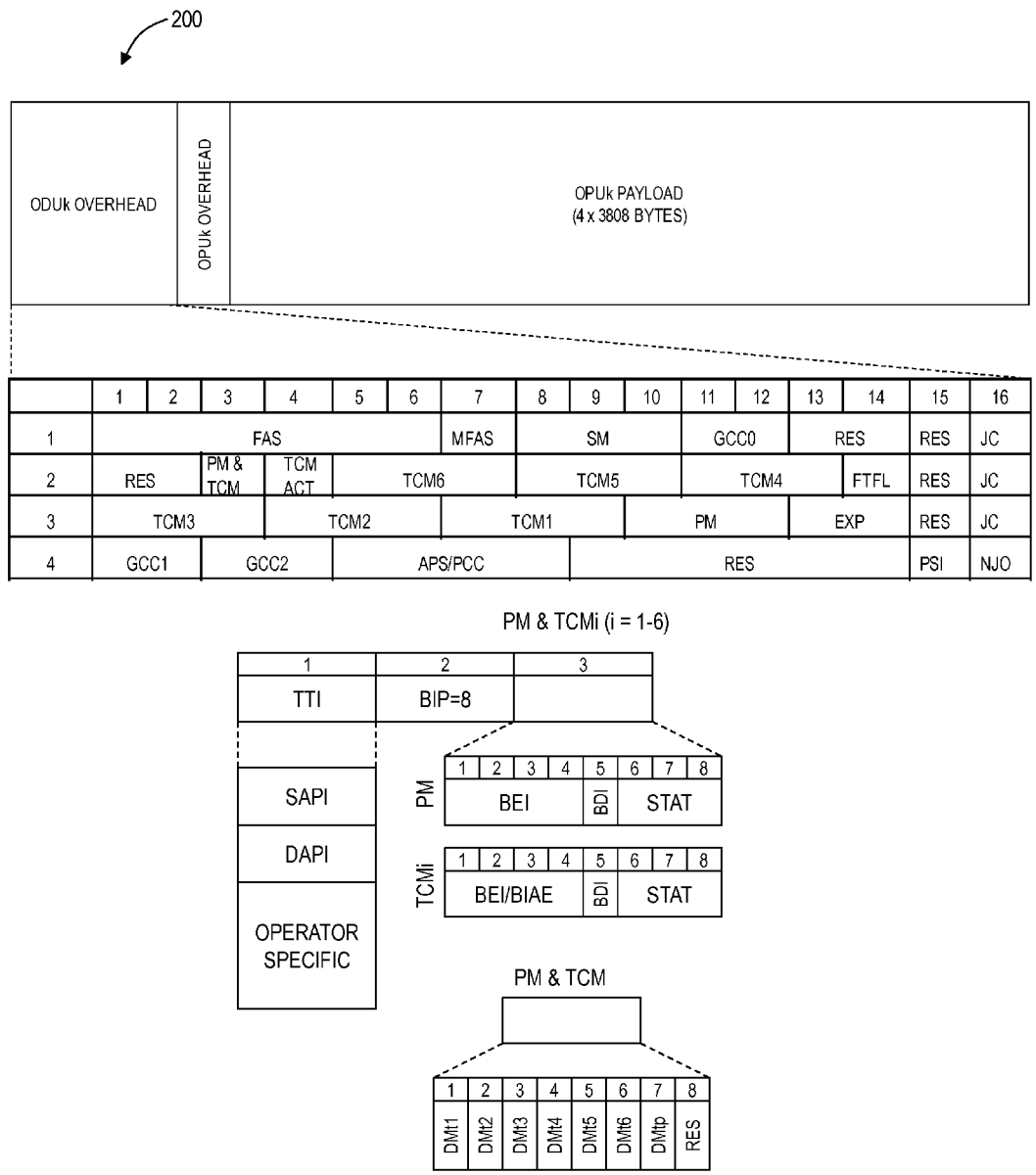
FIG. 2 is an Optical channel Data Unit (ODU) for use in the network of FIG. 1.

Referring to FIG. 2, in an exemplary embodiment, G.709 overhead 200 is partitioned into Optical channel Transport Unit (OTU) frame alignment bytes in row 1, columns 1-7; Optical channel Data Unit (ODU) overhead bytes in rows 2-4, columns 1-14; OTU overhead bytes in row 1, columns 8-14; and Optical channel Payload Unit (OPU) overhead in rows 1-4, columns 15-16. Further, the G.709 overhead 200 includes Forward Error Correction (FEC) data (not shown) in the frame. The OTU frame alignment bytes include a frame alignment signal (FAS) bytes and a multi-frame alignment signal (MFAS). Also, the G.709 overhead 200 includes section monitoring (SM) bytes and line monitoring (PM) bytes to provide optical layer error management between optical section and line in G.709. The SM bytes include dedicated BIP-8 monitoring to cover the payload signal. The first byte of the SM used for Trail Trace Identifier (TTI) which is a 64-byte character string similar to a section trace in SONET. The PM bytes include dedicated BIP-8 monitoring to cover the payload signal. The first byte of the PM is used for TTI which is similar to line trace in SONET.

General communication channel 0 (GCC0) bytes provide a communications channel between adjacent G.709 nodes. The G.709 overhead 200 further includes a payload signal identifier (PSI), justification control (JC), and negative justification opportunity (NJO). For asynchronous clients such as 10 GbE and 10 G FC, NJO and PJO are used as stuff bytes similar to PDH. If the client rate is lower than OPU rate, then extra stuffing bytes may be inserted to fill out the OPU. Similarly, if the incoming signal is slightly higher than the OPU rate, NJO and PJO bytes may be replaced with signal information, i.e. the OPU payload capacity is increased slightly to accommodate the extra traffic on the transceiver, and the JC bytes reflect whether NJO and PJO are data or stuff bytes the JC bytes are used at the off-ramp to correctly de-map the signal. The PSI provides an identification of the payload signal. Further, the G.709 overhead 200 also includes six levels of Tandem Connection Monitoring (TCMn). Of note, the G.709 overhead 200 includes various Reserved (RES) bytes such as in Col. 15, rows 1-3; Cols. 13-14, row 1; and Cols. 9-14, row 4.

In an Optical Transport Network (OTN, ITU standard G.709/Y.1331—12/2009), when client network traffic is associated with certain line protection protocols such as APS, an efficient way of transporting the client traffic over OTN is to map the active client traffic to ODUk/j at one end of the OTN and de-map it at the other end. However, the client protocol information and therefore the transparency of client traffic could be lost in that only the work line 114 is transmitted over the OTN network 118. Because of this loss of transparency on the protect line 116, some APS protections, for example via bidirectional APS 1+1 switching, could not be performed. For example, APS K-bytes are typically lost as line segments of overhead portions of SONET/SDH frames are terminated upon entering or transiting an OTN cloud. Not all Protection Switching Byte Failure (PSBF) alarms for Uni 1+1 can be raised correctly, nor can any of the APS 1:N, APS 1:N+1, or 1+1 bidirectional switching of APS protocols be performed.

Figure 3A:
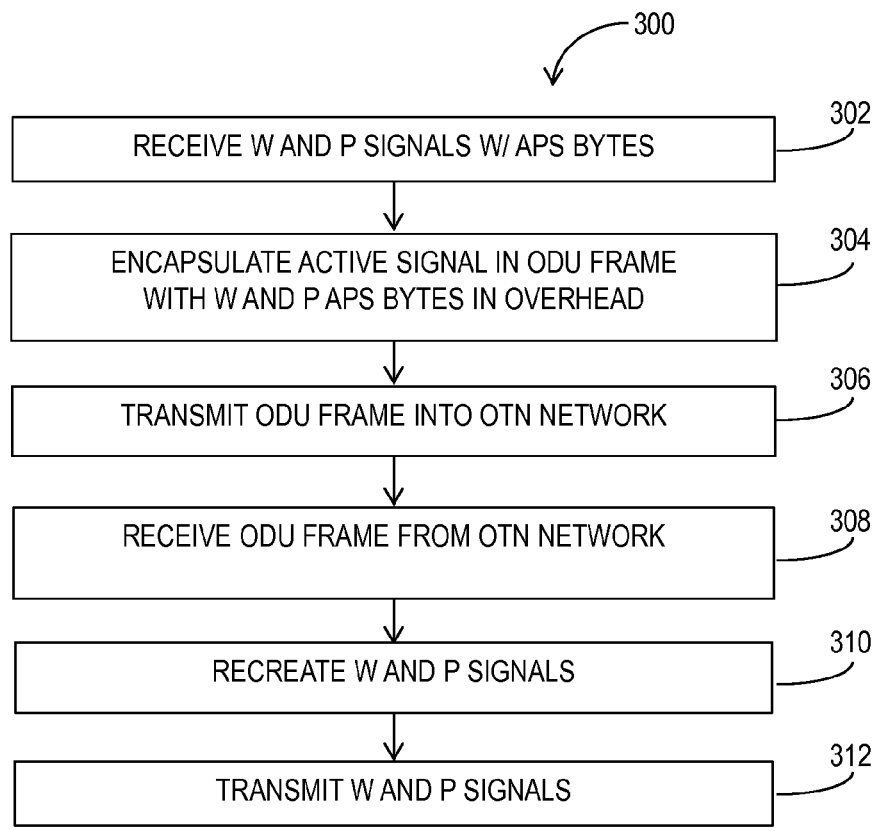
FIG. 3A is a flowchart representing an exemplary method of transmitting switching coordination bytes.

Referring to FIG. 3A, in an exemplary embodiment, a flowchart represents a method 300 of transmitting switching coordination bytes. A work (W) signal and a protect (P) signal are received (step 302) each including APS switching-coordination bytes and other overhead bytes. Either of the work signal or the protect signal is designated as an active signal according to and APS protocol. The active signal is encapsulated (step 304) in an ODU signal, the ODU signal having an overhead segment including the APS switching coordination bytes from the work signal and the APS switching coordination bytes from the protect signal. By encapsulating the active signal, the payload portion of the ODU signal contains the payload of the active signal and the overhead segment of the active signal. The APS switching-coordination bytes from the work and protect signals may be placed, for example, in unused or reserved (RES) bytes in the overhead 200 (FIG. 2). The ODU signal is transmitted (step 306, FIG. 3A) as a single signal into an Optical Transport Network (OTN) network. In at least one utilization of the method 300, the work signal and the protect signal are compliant with one of Synchronous Optical Networking (SONET) and Synchronous Digital Hierarchy (SDH).

Continuing with the example represented in FIG. 3A, the ODU signal is received from the OTN network (step 308). The work and protect signal are recreated (step 310) based on the payload of the active signal encapsulated in the ODU signal and the respective APS switching coordination bytes and other overhead bytes in the overhead segment of the ODU signal. The recreated work signal has an overhead segment including the APS switching-coordination bytes of the working signal received in step 302 and transmitted across the OTN network in the overhead segment of the ODU signal. Similarly, the recreated protect signal has an overhead segment including the APS switching-coordination bytes of the protect signal received in step 302. Both the recreated work signal and the recreated protect signal include the active signal payload. For example, if the work signal is designated as the active signal, both the recreated work signal and the recreated protect signal include the work signal payload. The work signal and the recreated protect signal are transmitted (step 312).

Various optional features of the method 300 are within the scope of these descriptions. In at least one such example, the received work signal and a protect signal include K-bytes on work and protect lines, and the K-bytes are transmitted on work and protect lines after the protect signal is recreated. Receiving (step 302) and transmitting (step 306), in at least one example, carry the APS switching coordination bytes according to an APS 1+1 protocol.

In a particular example, the work signal and the protect signal are transmitted over the OTN network with the ODU signal being a single signal, and APS, Virtual Line Switching Ring, or Bidirectional Line Switching Ring protection are performed between the work signal and the protect signal through maintaining the APS switching coordination bytes on the single signal in the OTN network.

The method 300 (FIG. 3A) may further include starting a hold off timer responsively to a failure on the ODU signal, continuing to send APS switching-coordination bytes from the active signal, and at an expiration of the hold off timer, sending an Alarm Indication Signal (AIS) on the active signal. Since the OTN network 118 can already include inherent protection at the OTN layer, it is desirable to restore first in the OTN network 118 prior to propagating the faults to the work and protect lines 114 and 116.

Figure 3B:
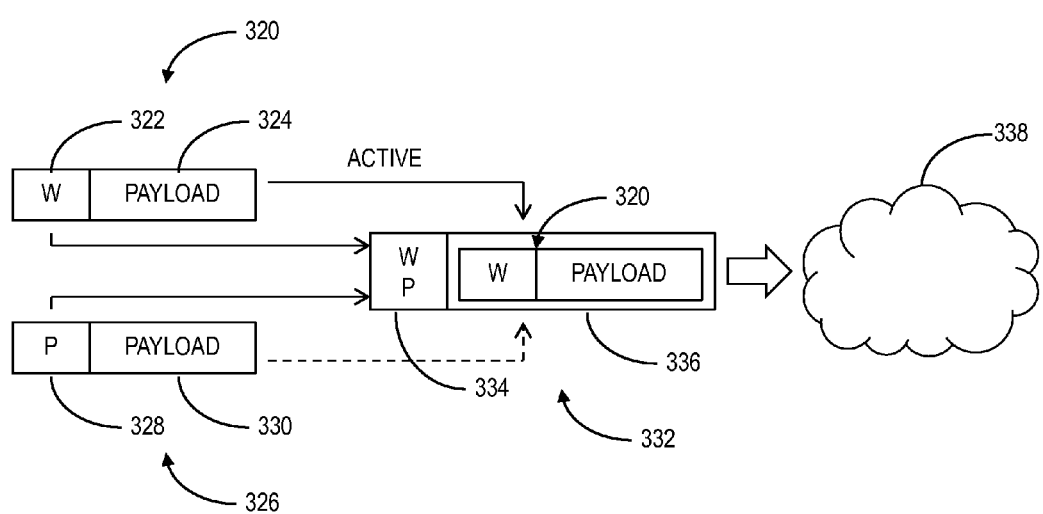
FIG. 3B is a diagram of an ODU signal generated based on work and protect signals according to the method of FIG. 3A.

Referring to FIG. 3B, a work signal 320 having an overhead segment 322 and a payload 324 is shown, in this example, as the designated active signal. A protect signal 326 having an overhead segment 328 and a payload 330 is also shown. An ODU signal 332 is shown having an overhead segment 334 and a payload 336. According to the illustrated embodiment, the payload 336 of the ODU signal 332 encapsulates the active signal in the payload. In this example, the work signal is designated as the active signal. Accordingly, the work signal 320 is shown encapsulated in the payload 336 of the ODU signal 332. As represented by dashed line, the protect signal 326 is designated as the active signal and is encapsulated in another example. The overhead segment 334 of the ODU signal 332 includes APS switching-coordination bytes from the work and protect signals. The ODU signal 332 is transmitted as a single signal into an Optical Transport Network (OTN) network 338.

Figure 3C:
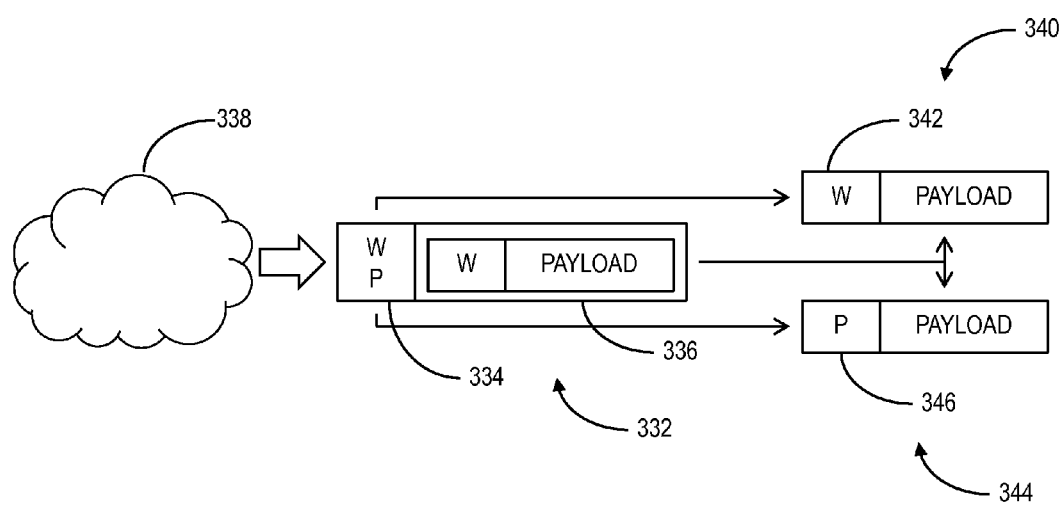
FIG. 3C is a diagram of work and protect signals recreated from the ODU signal of FIG. 3B according to the method of FIG. 3A.

Referring to FIG. 3C, and continuing with the example of FIG. 3B, the ODU signal 332 is received from the Optical Transport Network (OTN) network 338 and work and protect signals are recreated therefrom. The recreated work signal 340 has an overhead segment 342 including the APS switching-coordination bytes of the work signal 320 (FIG. 3B) which were transmitted across the OTN network 338 in the overhead segment 334 of the ODU signal 332. Similarly, the recreated protect signal 344 (FIG. 3C) has an overhead segment 346 including the APS switching-coordination bytes of the protect signal 326 (FIG. 3B). Both the recreated work signal 340 and the recreated protect signal 344 include the active signal payload. In this example, the work signal 320 is designated as the active signal, thus both the recreated work signal and the recreated protect signal include the work signal payload. As such, the FIGS. 3B and 3A exemplify the method 300 of FIG. 3A.

In the following descriptions, particular exemplary steps of a method are described in the context of APS-enabled SONET/SDH client traffic. However, concepts described herein apply to other types of client traffic and other types of protection mechanisms (BLSR, TLSR, VLSR). Furthermore, while traffic flow from the first client network element 110 to the second client network element 112 is expressly described, traffic flow in the opposite sense is within the scope of these descriptions, at least in view of the symmetry of FIG. 1. Additionally, while reference is made to the K-bytes, those of ordinary skill in the art will recognize other bytes from the protect line 116 can be transported in the overhead segment such as, for example, trace bytes and the like.

Figure 4:
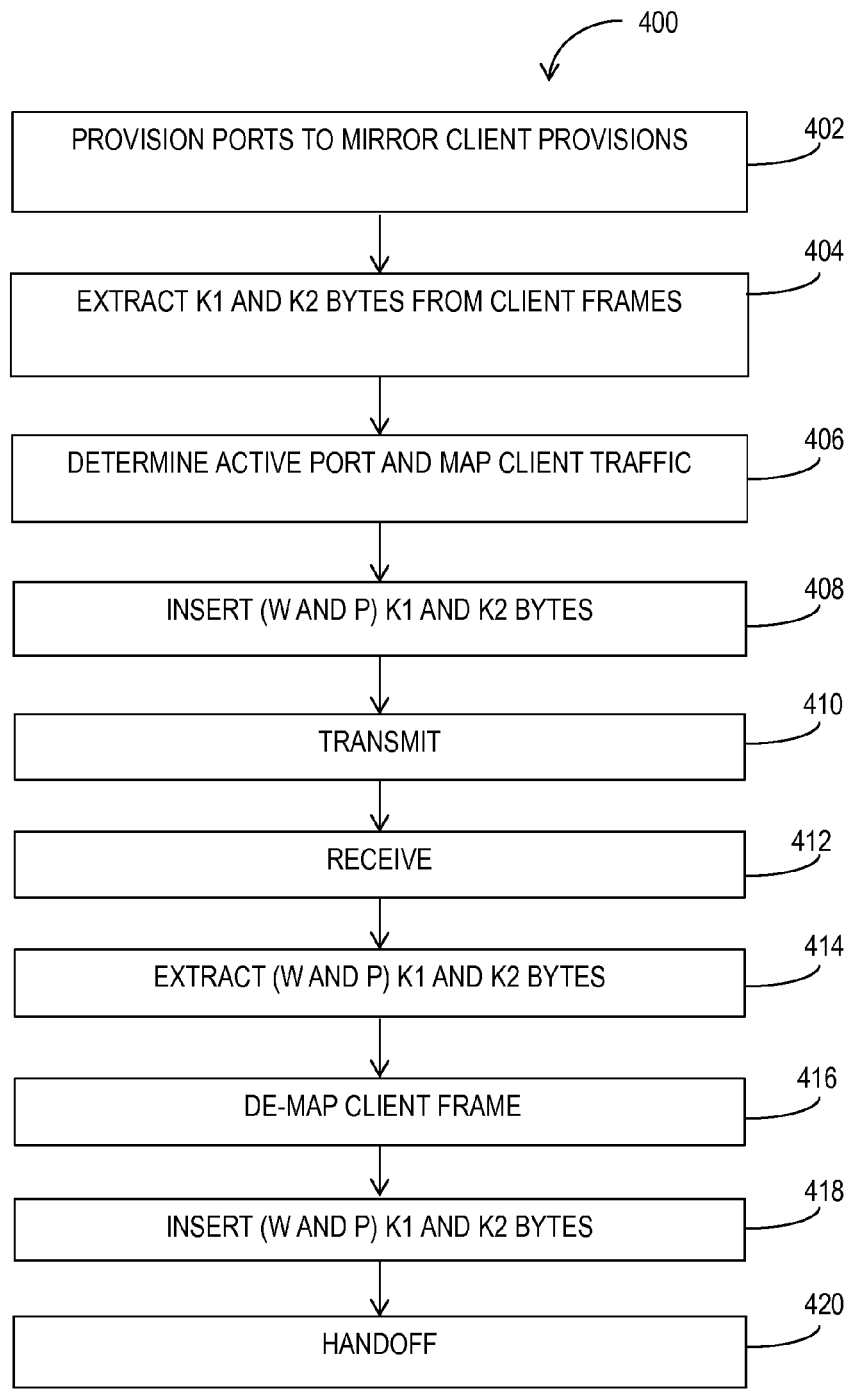
FIG. 4 is a flowchart representing an exemplary method of transmitting APS K bytes.

Reference is now made to FIG. 4 with regard to, in an exemplary embodiment, a flowchart that represents a method 400, and to FIG. 1 with regard to an exemplary system by which the method 400 is practiced. The method 400 transparently transports client traffic with line protection over an OTN network. In normal operation of transporting client traffic over an OTN network with APS protection, at the first and second carrier network elements 120 and 122 (FIG. 1), ports (a,b and x,y) are provisioned (step 402, FIG. 4) to mirror client provisions at the first and second client network elements 110 and 112. At the first carrier network element 120 (FIGS. 1), K1 and K2 bytes, designated herein as (K1, K2)_w and (K1, K2)_p are extracted (step 404, FIG. 4) from client frames received on ports (a,b) from the work and protect lines 114 and 116, respectively. Continuing at the first carrier network element 120 (FIG. 1), the active port (a or b) is determined and client traffic is mapped (step 406, FIG. 4) from the active port (a) to an ODUk/j tunnel on the carrier network. Further at the first carrier network element 120 (FIG. 1), both the received (K1, K2)_w and (K1, K2)_p are inserted (step 408, FIG. 4), in one example, into the APS/PCC bytes of the ODUk/j frame header. The RES bytes of the ODUk/j frame header could be used additionally or alternatively if not already being used for another purpose. The ODUk/j frame is transmitted (step 410) at the first carrier network element 120 and received (step 412) at the second carrier network element 122 across the OTN network 118.

At the second carrier network element 122 (FIG. 1) on the far side of the OTN network 118, the (K1,K2) w and (K1,K2)$_{13}$p values are extracted (step 414, FIG. 4) from the APS/PCC bytes of the received ODUk/j frame, and/or the RES bytes if they are used. Continuing at the second carrier network element 122 (FIG. 1), the client frame is de-mapped (step 416) from the payload portion OPUk/j of the received ODUk/j frame. Further at the second carrier network element 122 (FIG. 1), (K1,K2)_w are inserted (step 418) into the K1, K2 bytes of a client frame and handed off (step 420) to work line 124 (FIG. 1) via port x. (K1,K2)_p are inserted (step 418) into the K1, K2 bytes of a client frame and handed off (step 420) to protect line 126 (FIG. 1) via port y. Note that after the K-bytes insertion, the Bit Interleaved Parity (BIP) may be re-calculated over all the bits of the line overhead or multiplex section overhead and payload (Envelop Capacity, or Administrative Unit). The new BIP value can then placed in the B2 byte of the next frame.

An exemplary algorithm is provided for use when an APS line is down. When the protect line between first client network element 110 and the first carrier network element 120 fails, for example, in Loss of Signal (LOS) conditions, the (K1,K2)_p bytes are not available from the client protect line. A value that indicates an Alarm Indication Signal-Line (AIS-L) or a Multiplex Section-Alarm Indication Signal (MS-AIS) should be used in step 408. That value is inserted to the corresponding frame overhead on port y in step 418. When the work line on the first carrier network element 120 detects Signal Fail, before APS switches to protect line, the work line of the second client network element 112 will detect AIS-L frames. The work line of the second client network element 112, however, will not detect AIS-L since it continues to get good K1 K2 bytes. Thus, transparency is guaranteed in these cases.

An exemplary algorithm is provided for use upon carrier network failure. When the carrier network fails, it will no longer be able to provide full service to the client. AIS-L frames are sent downstream on work and protect lines 124 and 126. However, to avoid sympathetic switching of the client due to a carrier network frame slip or glitch, a hold off time should be applied before sending AIS-L K-bytes to the client. Specifically, when the second carrier network element 122, as depicted in FIG. 1, detects a carrier network failure such as ODU-AIS, it starts a hold off timer. Meanwhile, it continuously sends current good K-bytes to client port x and y of the second client network element 112. Upon expiry of the hold off timer, if the carrier network failure is still present, the second carrier network element 122 starts sending AIS-L K-bytes to both port x and y of the second client network element 112.

According to at least one embodiment, a solution is provided to the practical transparency problem that exists in transporting client traffic over OTN when the client traffic belongs to a protection group. A clear algorithmic approach provides any K-Byte exchanging protection protocol on the transparent client side over a network OTN cloud (Bidirectional APS 1+1, true Unidirectional APS 1+1, APS 1:N, APS 1:N+1, BLSR, TLSR).

Entities that may utilize the one or more embodiments include, but are not limited to, telecom carriers, large businesses with OTN networks and telecom equipment vendors who provide transparent client side protection or CBR client side protection or Y-Cable Ethernet APS Protection.

Figure 5:
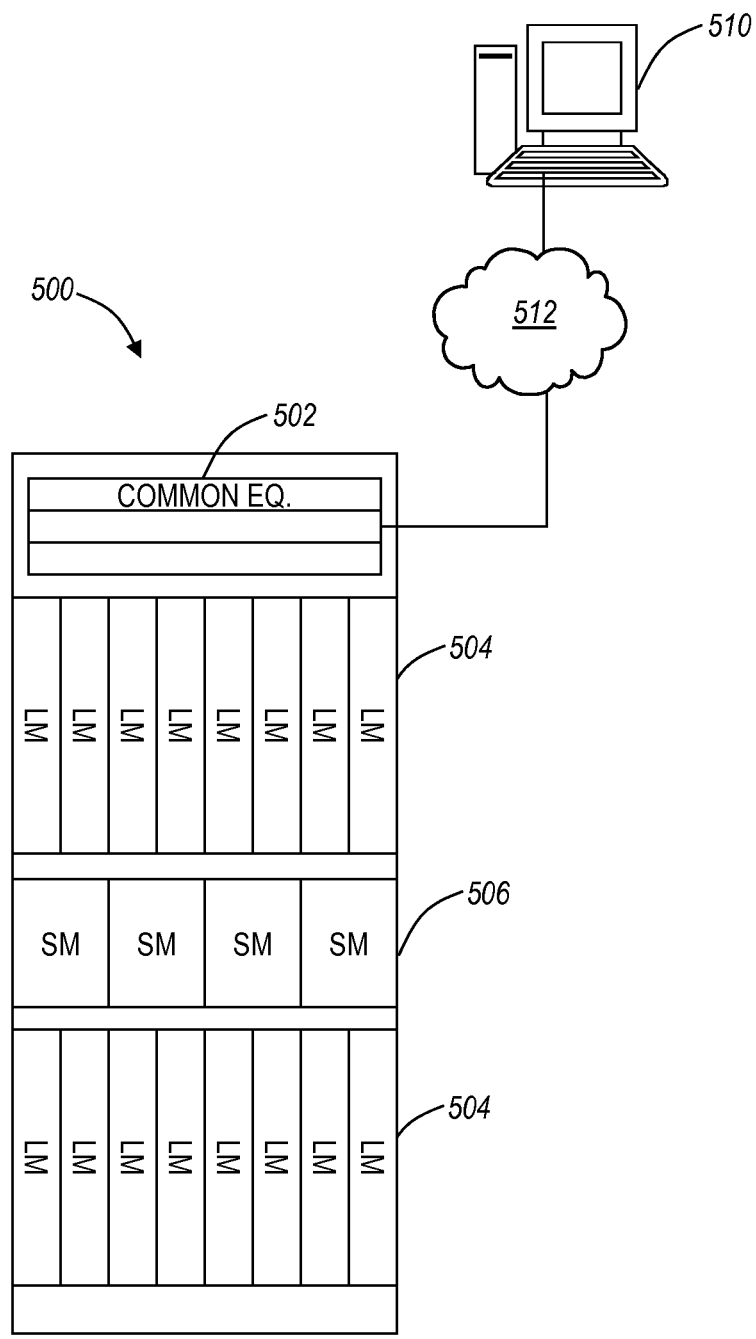

Referring to FIG. 5, in an exemplary embodiment, an optical switch 500 is illustrated supporting the methods and systems described herein and the like. The optical switch 500 is a network element (NE) that may consolidate the functionality of a multi-service provisioning platform (MSPP), SONET/SDH digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the optical switch 500 includes common equipment 502, line modules (LM) 504, and switch modules (SM) 506. The common equipment 502 may include power, a control module, operations, administration, maintenance, and provisioning (OAM&P) access, and the like. For example, the common equipment 502 may connect to a management system 510 through a data communication network 512. The management system 510 may include a network management system (NMS), element management system (EMS), or the like. Note, the management system 510 may support "Click and Go" provisioning of services. Additionally, the common equipment 502 may include a control plane processor configured to operate the control plane and the systems and methods described herein.

The line modules 504 may be communicatively coupled to the switch modules 506, such as through a backplane, midplane, or the like. The line modules 504 are configured to provide ingress and egress to the switch modules 506, and are configured to provide interfaces for the OTN services described herein. In an exemplary embodiment, the line modules 504 may form ingress and egress switches with the switch modules as center stage switches for a three-stage switch, e.g. three stage Clos switch. The line modules 504 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTU3, ODU4), etc. Further, the line modules 504 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 504 may include DWDM interfaces, short reach interfaces, and the like, and may connect to other line modules 504 on remote optical switches 500, NEs, end clients, and the like. From a logical perspective, the line modules 504 provide ingress and egress ports to the optical switch 500, and each line module 504 may include one or more physical ports.

The switch modules 506 are configured to switch services between the line modules 504. For example, the switch modules 506 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; and the like. Specifically, the switch modules 506 may include both Time Division Multiplexed (TDM) and packet switching engines. The switch modules 506 may include redundancy as well, such as 1:1, 1:N, etc. In an exemplary embodiment, the line modules 504 and the switch modules 506 are configured to manage and provide SONET, SDH, and OTN line signals. That is, the line modules 504 and the switch modules 506 may be line terminating in terms of SONET, SDH, and OTN overhead.

Figure 6:
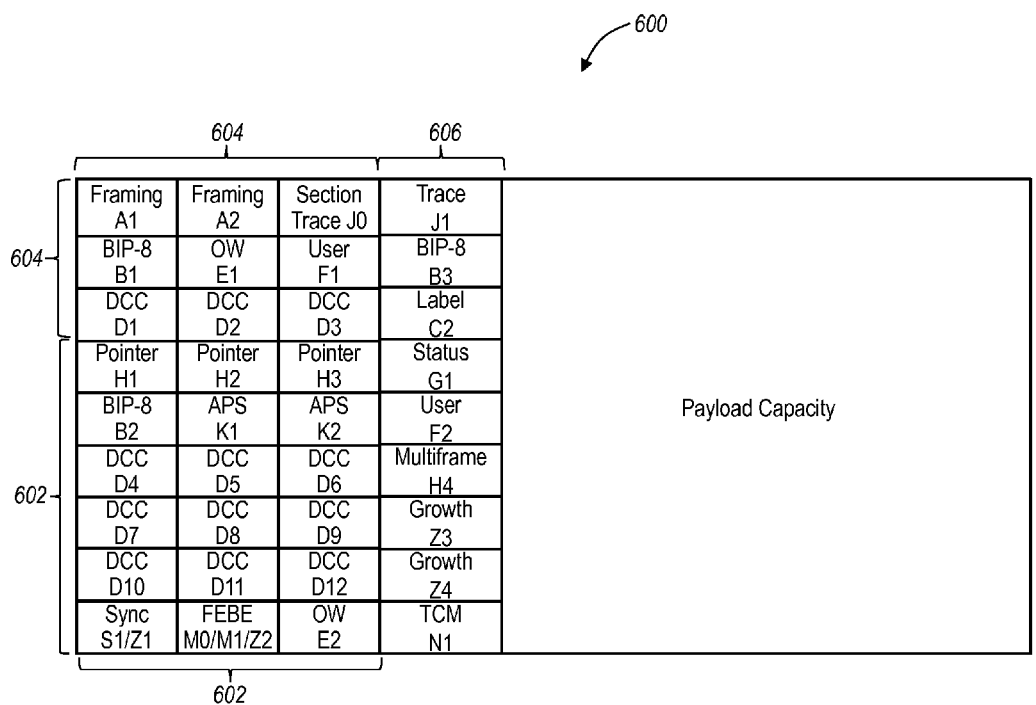
FIG. 6 is an SONET/SDH frame having an overhead portion and a payload portion.

Referring to FIG. 6, in an exemplary embodiment, a SONET/SDH frame 600 is illustrated as having an overhead portion 602 and a payload portion 604. The overhead portion 602 includes a line segment 606, a section segment 608, and a line segment 606. APS K1 and K2 bytes are included in the line segment 606. In transiting an OTN network, the line segment 606 of the overhead portion 602 is lost when crossing an intermediate line terminating (LTE) network element. Of note, the work line 114 is transmitted as part of the ODU payload in a fully transparent manner; the protect line 116 is not. It is the intent of the methods and systems described herein to take specific overhead bytes from the overhead portion 602 of the protect line 116 and encapsulate them in the overhead segment of the ODU line carrying the work line 114. At the far end, these specific overhead bytes and the payload portion 602 of the work line 114 are used to recreate the protect line 116 preserving APS switching between the work line 114 and the protect line 116.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of tunneling in an Optical Transport Network (OTN), comprising:
   receiving a working signal and a protection signal, wherein the working signal has a working payload and working overhead bytes with working Automatic Protection Switching (APS) switching coordination bytes, the protection signal has a protection payload and protection overhead bytes with protection APS switching coordination bytes, and the working signal or the protection signal is designated as an active signal with an active payload and active overhead bytes;
   generating an Optical channel Data Unit (ODU) signal with an ODU signal payload and an overhead segment, wherein the ODU signal payload is the active payload, and the overhead segment has portions of the working overhead bytes and the protection overhead bytes including the working APS switching coordination bytes and the protection APS switching coordination bytes;
   transmitting the ODU signal into an Optical Transport Network (OTN) network, wherein the ODU signal is a single signal transported over the OTN network;
   receiving the ODU signal from the OTN network;
   recreating the working signal based on the active payload in the ODU signal payload and the working overhead bytes in the overhead segment;
   recreating the protection signal based on the active payload in the ODU signal payload and the protection overhead bytes in the overhead segment; and
   transmitting the recreated working signal and the recreated protection signal.

2. A method according to claim 1, wherein the working signal and the protection signal are compliant with one of Synchronous Optical Networking (SONET) and Synchronous Digital Hierarchy (SDH).

3. A method according to claim 1, wherein the working APS switching coordination bytes and the protection APS switching coordination bytes are placed in unused or reserved bytes in the ODU signal overhead segment.

4. A method according to claim 1, wherein:
   the working APS switching coordination bytes comprise K-bytes; and
   the protection APS switching coordination comprise K-bytes.

5. A method according to claim 1, wherein:
   the working overhead bytes comprise working APS K bytes;
   the protection overhead bytes comprise protection APS K bytes; and
   the ODU signal overhead segment comprises the working APS K bytes and the protection APS K bytes.

6. A method according to claim 5, wherein transmitting the recreated working signal and the recreated protection signal comprises transmitting the working APS K bytes on a working line and transmitting the protection APS K bytes on a protection line.

7. A method according to claim 1, wherein the steps of receiving a working signal and a protection signal and transmitting the recreated working signal and the recreated protection signal carry APS switching coordination bytes according to an APS 1+1 protocol.

8. A method according to claim 1, further comprising performing APS, Virtual Line Switching Ring, or Bidirectional Line Switching Ring protection between the working signal and the protection signal through maintaining the APS switching coordination bytes on the single signal in the OTN network.

9. A method according to claim 1, further comprising:
   responsive to a failure on the ODU signal, starting a hold off timer;
   sending APS switching-coordination bytes from the active signal; and
   at an expiration of the hold off timer and responsive to the OTN network not restoring the ODU signal, sending an alarm indication signal (AIS) on the active signal.

10. A network comprising:
    a first node configured to:
    receive a working signal and a protection signal each with Automatic Protection Switching (APS) switching coordination bytes;
    recognize the working signal or the protection signal as an active signal;
    encapsulate the active signal in an Optical channel Data Unit (ODU) signal;

insert the APS switching coordination bytes from the working signal in an overhead segment of the ODU signal;
insert the APS switching coordination bytes from the protection signal in an overhead segment of the ODU signal; and
transmit the ODU signal into an Optical Transport Network (OTN) network, and
a second node configured to:
receive the ODU signal from the OTN network;
recreate the working signal based on the active signal encapsulated in the ODU signal and the APS switching coordination bytes from the working signal inserted in the ODU signal;
recreate the protection signal based on the active signal encapsulated in the ODU signal and the APS switching coordination bytes from the protection signal inserted in the ODU signal;
transmit the recreated working signal and the recreated protection signal;
wherein the ODU signal comprises a single signal transmitted over the OTN network while maintaining both the active signal and the APS switching coordination bytes from the working signal and protection signal therein.

11. A network according to claim 10, wherein the working signal and the protection signal are compliant with one of Synchronous Optical Networking (SONET) and Synchronous Digital Hierarchy (SDH).

12. A network according to claim 10, wherein the first node is configured to insert APS switching-coordination bytes from the working signal and the protection signal into unused or reserved bytes in the overhead segment of the ODU signal.

13. A network according to claim 10, wherein the working signal and the protection signal comprises receiving K-bytes on working and protection lines.

14. A network according to claim 10, wherein the first and second nodes are together configured to carry the APS switching coordination bytes according to an APS 1+1 protocol.

15. A network according to claim 10, wherein the first node is configured to transmit the ODU signal as a single signal; and
perform APS, Virtual Line Switching Ring, or Bidirectional Line Switching Ring protection between the working signal and the protection signal through maintaining the APS switching coordination bytes on the single signal in the OTN network.

16. A network according to claim 10, wherein the second node is configured to, responsive to a failure on the ODU signal, start a hold off timer;
continue to send APS switching-coordination bytes from the active signal; and
at an expiration of the hold off timer and responsive to the ODU signal not being restored by the OTN network, send an alarm indication signal (AIS) on the active signal.

17. A node, with tunneling in Optical Transport Network (OTN), the node comprising:
one or more modules configured to:
receive a working signal and a protection signal, wherein the working signal comprises a working payload and working overhead bytes with working Automatic Protection Switching (APS) switching coordination bytes, the protection signal comprises a protection payload and protection overhead bytes with protection APS switching coordination bytes, and the working signal or the protection signal is designated as an active signal comprising an active payload and active overhead bytes;
generate an Optical channel Data Unit (ODU) signal comprising an ODU signal payload and an overhead segment, the ODU signal payload comprising the active payload, the overhead segment has portions of the working overhead bytes and the protection overhead bytes including the working APS switching coordination bytes and the protection APS switching coordination bytes; and
transmit the ODU signal into an Optical Transport Network (OTN) network, wherein the ODU signal comprises a single signal transported over the OTN network;
wherein the ODU signal is received at another node from the OTN network where the working signal is recreated based on the active payload in the ODU signal payload and the working overhead bytes in the overhead segment, the protection signal is recreated based on the active payload in the ODU signal payload and the protection overhead bytes in the overhead segment, and the recreated working signal and the recreated protection signal are transmitted from the another node.

18. A node according to claim 17, wherein the working signal and the protection signal are compliant with one of Synchronous Optical Networking (SONET) and Synchronous Digital Hierarchy (SDH).

19. A node according to claim 17, wherein the node is configured to insert APS switching-coordination bytes from the working signal and the protection signal into unused or reserved bytes in the overhead segment of the ODU signal.

20. A node according to claim 17, wherein the working signal and the protection signal comprises receiving K-bytes on working and protection lines.

21. A node according to claim 17, wherein the node and the another node are together configured to carry the APS switching coordination bytes according to an APS 1+1 protocol.

* * * * *